United States Patent
Peyton, Jr. et al.

(10) Patent No.: US 10,614,218 B2
(45) Date of Patent: Apr. 7, 2020

(54) SCAN TIME REDUCTION IN APPLICATION CODE SECURITY SCANNING

(71) Applicant: International Business Machines Corporation, Armonk, NY (US)

(72) Inventors: John T. Peyton, Jr., Arlington, MA (US); Babita Sharma, Mississauga (CA); Jason N. Todd, Lunenburg, MA (US); Jeffrey C. Turnham, Newmarket (CA); Mathieu Merineau, Laval (CA); Ettore Merlo, Montreal (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

(21) Appl. No.: 15/484,685

(22) Filed: Apr. 11, 2017

(65) Prior Publication Data

US 2018/0137279 A1    May 17, 2018

Related U.S. Application Data

(60) Provisional application No. 62/422,381, filed on Nov. 15, 2016.

(51) Int. Cl.
| | |
|---|---|
| *G06F 21/56* | (2013.01) |
| *G06F 21/57* | (2013.01) |
| *G06F 21/50* | (2013.01) |
| *G06F 11/36* | (2006.01) |

(52) U.S. Cl.
CPC ............ *G06F 21/563* (2013.01); *G06F 21/50* (2013.01); *G06F 21/565* (2013.01); *G06F 21/577* (2013.01); *G06F 11/36* (2013.01); *G06F 2221/034* (2013.01)

(58) Field of Classification Search
CPC .... G06F 21/563; G06F 21/565; G06F 21/577; G06F 2221/034; G06F 21/50; G06F 11/36
See application file for complete search history.

(56) References Cited

U.S. PATENT DOCUMENTS

| | | | |
|---|---|---|---|
| 8,087,084 B1 * | 12/2011 | Andruss ................ | G06F 21/562 713/188 |
| 9,104,859 B1 * | 8/2015 | Banerjee ............... | G06F 21/554 |
| 9,430,200 B1 | 8/2016 | Trofin et al. | |
| 2006/0212941 A1 * | 9/2006 | Bronnikov ............ | G06F 21/577 726/24 |
| 2014/0123295 A1 | 5/2014 | Kuykendall et al. | |

(Continued)

*Primary Examiner* — Huan V Doan
(74) *Attorney, Agent, or Firm* — Cantor Colburn LLP; Jeffrey S LaBaw

(57) ABSTRACT

A computer-implemented method for security scanning application code includes executing, via a processor, a full scan of the application code and generating a program intermediate representation (IR) and a list of security findings determined by the full scan. The processor executes an incremental scan of the application code after at least one change to the application code, and identifies at least one changed file in the application code. The processor then generates an incremental intermediate representation (IR) based at least in part on the at least one changed file. The processor merges the saved scan state and the incremental IR, produces a merged scan state, and outputs security findings based at least in part on the merged scan state and the incremental IR.

14 Claims, 5 Drawing Sheets

(56) References Cited

U.S. PATENT DOCUMENTS

| | | |
|---|---|---|
| 2014/0130171 A1 | 5/2014 | Chiang et al. |
| 2014/0344939 A1* | 11/2014 | Tripp .................... G06F 21/577 726/25 |
| 2015/0309813 A1* | 10/2015 | Patel ........................ G06F 8/75 703/22 |
| 2016/0180096 A1* | 6/2016 | Sharma ................. G06F 21/577 726/25 |
| 2016/0357958 A1 | 12/2016 | Guidry |
| 2017/0053118 A1* | 2/2017 | Malkov ................... G06F 21/56 |
| 2017/0154183 A1 | 6/2017 | Cox et al. |

* cited by examiner

SCAN TIME REDUCTION IN APPLICATION CODE SECURITY SCANNING

DOMESTIC PRIORITY

This U.S. Non-Provisional Application claims the benefit of U.S. Provisional Application Ser. No. 62/422,381, entitled, "SCAN TIME REDUCTION IN APPLICATION SECURITY SCANNING," filed Nov. 15, 2016, the disclosure of which is incorporated by reference herein in its entirety.

BACKGROUND

The present description relates to application code security analysis, and more specifically, to scan time reduction in application security scanning.

In static security analysis of application code, the application code is parsed into an intermediate program representation, and program analysis is done to detect the entry of tainted data into the application and its flow via intermediate variable assignments, function calls, etc. This intermediate representation could be analyzed to show that data originating from an external source (like a web page) is passed through consecutive function calls until it ends up in a SQL Query. If none of the intermediate function calls properly validate the passed data, the application can be vulnerable to a SQL Injection attack.

SUMMARY

According to an embodiment of the present invention, a computer-implemented method for scanning application code is described. In an example embodiment, the processor executes a full scan of the application code and saves a scan state. The scan state includes a program intermediate representation (IR) and a list of security findings determined by the full scan. The processor executes an incremental scan of the application code after at least one change to the application code, and identifies at least one changed file in the application code. The processor then generates an incremental intermediate representation (IR) based at least in part on the at least one changed file. The processor merges a saved scan state and the incremental IR, produces a merged scan state, and outputs security findings based at least in part on the merged scan state and the incremental IR.

According to another embodiment, a system for scanning application code is described. In an example embodiment, the system includes a processor configured to execute a full scan of the application code and generating a program intermediate representation (IR) and a list of security findings determined by the full scan. The processor is configured to execute an incremental scan of the application code after at least one change to the application code, identify at least one changed file in the application code, and generate an incremental intermediate representation (IR) based at least in part on the changed file. The processor merges a saved scan state and the incremental IR, and produces a merged scan state. The processor then outputs security findings based at least in part on the merged scan state and the incremental IR.

According to one or more embodiments, a computer program product including a computer-readable storage medium is described. The computer-readable storage medium includes program instructions that are executable by a processor to cause a computer to perform a method for scanning application code. The method includes executing a full scan of the application code and generating a program intermediate representation (IR) and a list of security findings determined by the full scan. The processor executes an incremental scan of the application code after at least one change to the application code, and identifies at least one changed file in the application code. The processor then generates an incremental intermediate representation (IR) based at least in part on the at least one changed file. The processor merges a saved scan state and the incremental IR, produces a merged scan state, and outputs security findings based at least in part on the merged scan state and the incremental IR.

BRIEF DESCRIPTION OF THE DRAWINGS

The subject matter which is regarded as the invention is particularly pointed out and distinctly claimed in the claims at the conclusion of the specification. The forgoing and other features, and advantages of embodiments of the invention are apparent from the following detailed description taken in conjunction with the accompanying drawings in which:

DETAILED DESCRIPTION

Figure 1:
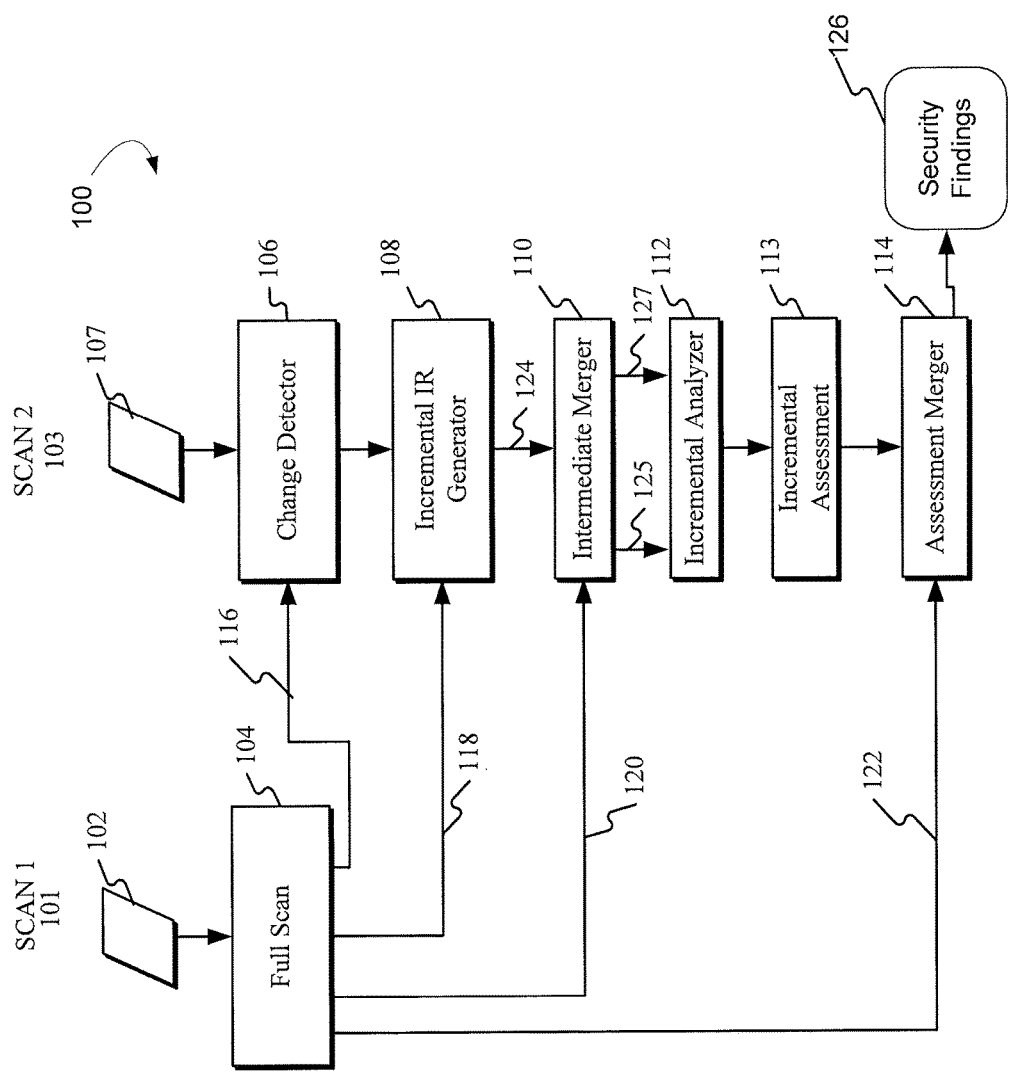
FIG. 1 depicts a flow diagram of a system for security scanning according to embodiments of the present invention.

In order to build the comprehensive scan state and do a program analysis that accomplishes a high level of security for the static security analysis, every piece of code related to the target application must be processed each time a change is made. For very large or complex applications, this process can be very time intensive, and can make static security analysis for minute changes infeasible. This makes development for high risk applications difficult if the developer wants to use static security analysis on every single change of the application code.

Program analysis accounts for incremental changes to the subject program code. Different conventional methods can use varying levels of granularity when choosing the code changes. For example, one current method uses file-level granularity. With file-level granularity, if any part of a file is changed then all the code in the file is re-analyzed. This method can be less advantageous in some circumstances because the affected changed code can be a large enough proportion of the original program to severely limit time improvements. Another conventional method uses instruction level granularity, where only individual instructions that are changed and affected by other changed instructions are reanalyzed. This level of granularity can make computation of the set of changes needing reanalysis difficult and slower to compute. An intermediate routine-level granularity can resolve disadvantages of instruction level granularity and file-level granularity because it can minimize both the amount of code needing reanalysis and the time to determine what that code is, thereby speeding up overall analysis time to get the security results With the level of granularity being inclusive of the whole program, some conventional approaches analyze the changed code and only return results based at least in part on that part of the code. This approach generally ignores the findings from the rest of the program, and can be less useful in the typical workflow of analyzing code and tracking results.

In another approach, instead of processing executable code or comparing a scan state against a theoretical model that could represent a security flaw, it can be beneficial to compare an intermediate representation of a program with a previous scan state of the same program in order to determine differences at the intermediate level. A scan state can include a program intermediate representation (IR) and a list of security findings determined by the full scan. For example, the scan state can state may include other aspects of the program and scanning environment. This approach can return results that would surface if the whole program had been reanalyzed, without doing that full analysis. By using the knowledge of the differences, the time required to analyze the more recent version of the program can be reduced.

Embodiments of the present invention can isolate the developer's small change to the application code or source code (referred to hereafter, collectively, as "application code 102"), convert the application code to a representation solely for the purpose of static security analysis, merge that change into a previous scan state, and perform a security analysis upon the merged representation. This process can result in over 70% reduction in time required and allows for static security analysis on very small changes without incurring the large time investment.

FIG. 1 depicts a block diagram of a system 100 for security scanning, according to an embodiment of the present invention. System 100 can be configured for incremental analysis based at least in part on a granularity of change at the routine level, and returns results that are inclusive of the entire new program. With respect to function-level granularity, individual routines are the unit of change. According to one embodiment, an entire routine can be included in the analysis based at least in part on whether it is new, has changed, or is affected by the changes.

A general overview of an embodiment will be provided with respect to FIG. 1, with greater detail provided in the subsequent figures. Referring now to FIG. 1, according to embodiments of the invention, system 100 can evaluate application code 102 and effectuate a full scan 104 of application code 102. After system 100 performs the initial full scan of the application code 102, system 100 performs a second scan 103 of source code 107 (which is a modified version of source code and may or may not be different from 102). Second scan 103 performs the incremental analysis based at least in part on changes at the routine level. System 100 includes a change detector 106 that can compute checksums for the source files received in source code 107 and compare them with the received file checksums 116 and determines which files have changed. In other aspects, change detector 106 may use other methods to determine which files have changed. System 100 further includes an incremental IR generator 108 that receives variable and method types 118 from full scan 104 and computes an incremental intermediate representation (incremental IR) 124 for changed files. Intermediate merger 110 is configured to receive the incremental IR 124, and determine function-level changes in source code 107 by merging incremental IR 124 with a scan state 120 from full scan 104, and by observing differences in incremental IR 124 and scan state 120. In some aspects, scan state 120 includes program intermediate representation (IR) and security findings, amongst other possible data items. Incremental analyzer 112 then computes an impact graph using the merged intermediate IR 125 and the changed functions list 127 and performs an iterative taint-flow analysis producing an incremental assessment 113. In some aspects, system 100 further includes an assessment merger 114 configured to combine the incremental assessment 113 from incremental analyzer 112 with full scan 104 assessment results 122, and generate security findings 126 for source code 107.

Figure 2:
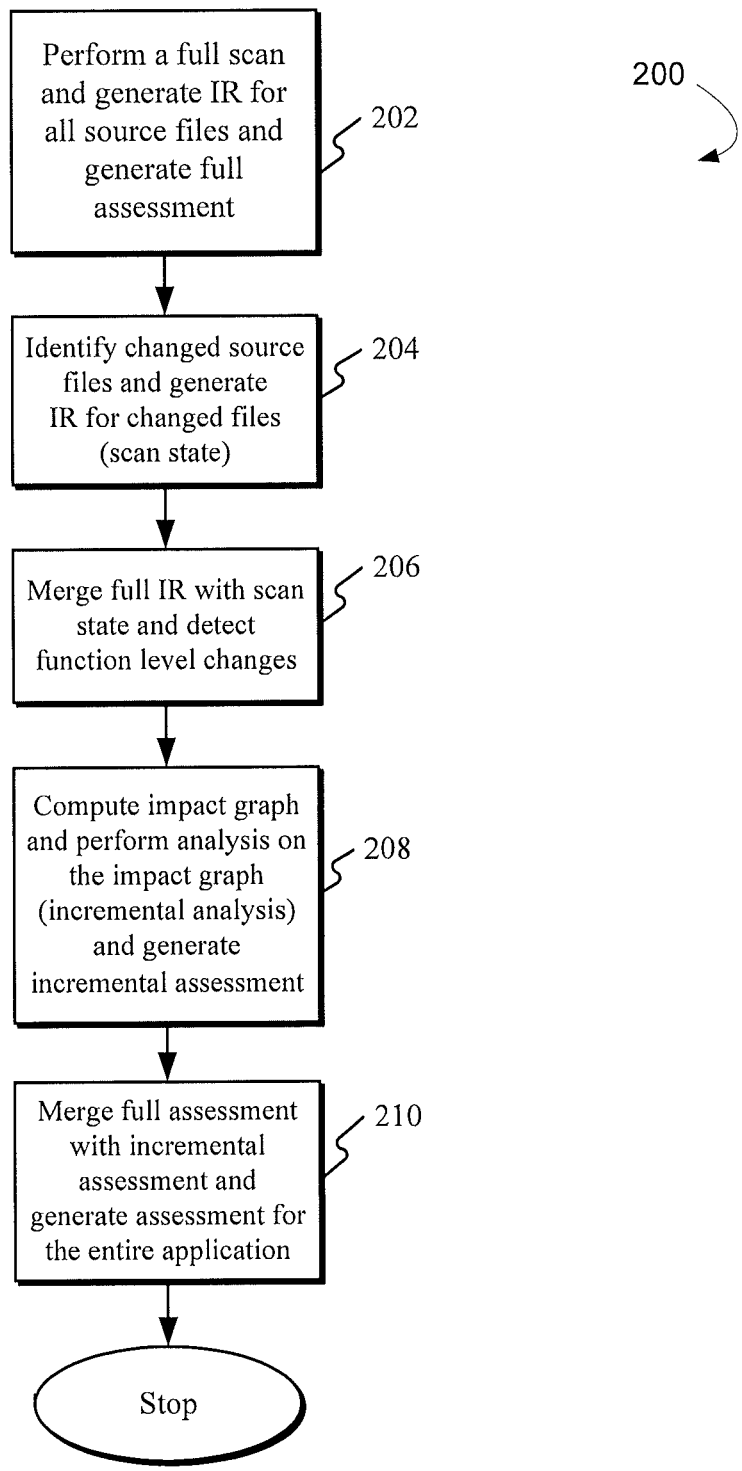
FIG. 2 depicts a flow diagram for a method for security scanning according to embodiments of the present invention.
Figure 5:
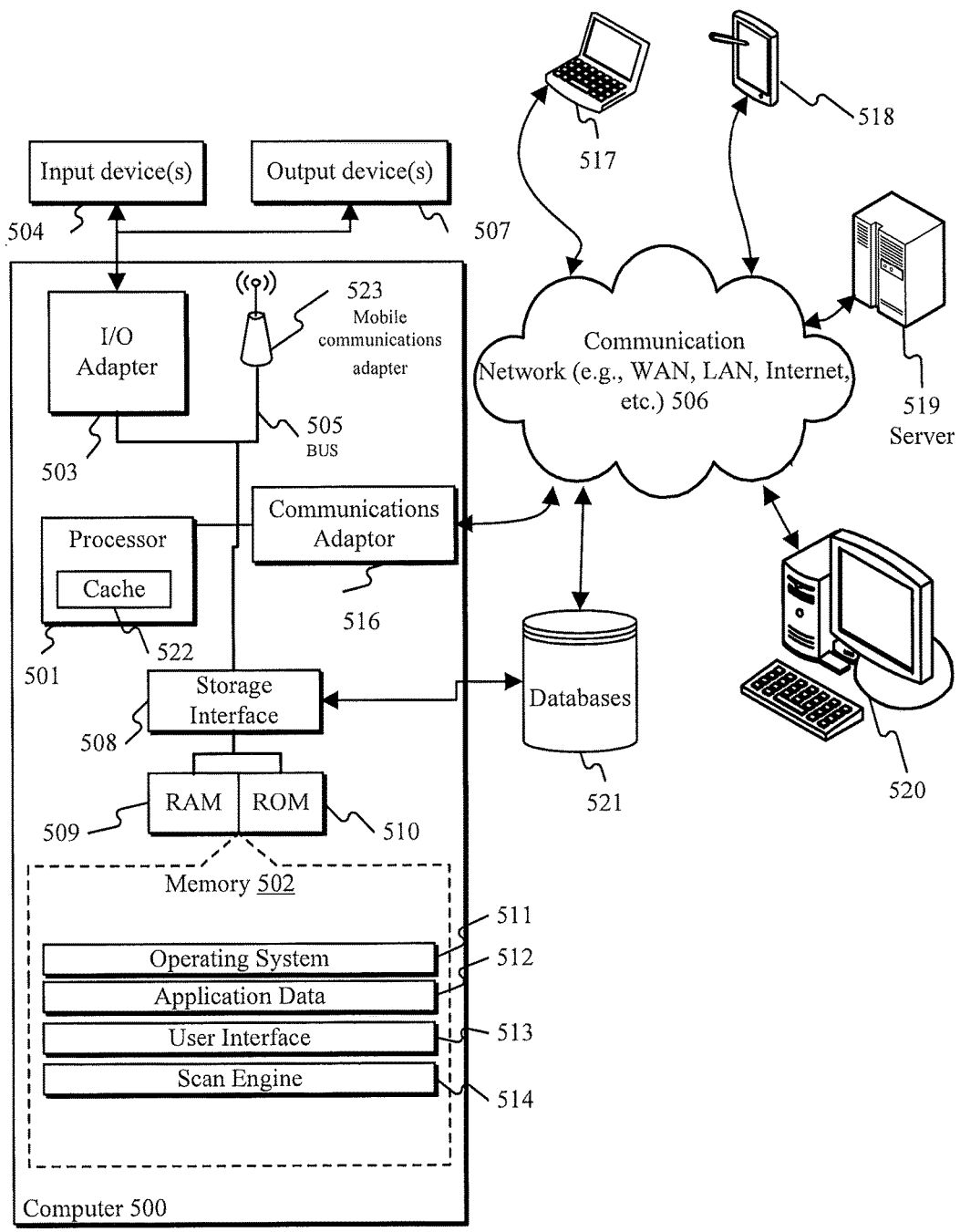
FIG. 5 depicts a block diagram of a computer system and environment according to embodiments of the present invention.

Now considering the various aspects of system 100 (FIG. 1) in greater detail, FIG. 2 depicts a method 200 for security scanning, and FIG. 5 depicts a block diagram of a computer system and environment in which system 100 operates, according to embodiments of the invention. Referring first to FIG. 2, in block 202, first a full scan 104 of application code 102 is run by a system processor (e.g., processor 501 shown in FIG. 5). Full scan involves parsing all source files and generating an intermediate representation for all of them and analyzing all the routines in the whole application. An incremental scan involves parsing only changed files, finding the routines that have changed in these files, and then analyzing only the changed routines and their impact. Processor 501 can save the variable and method types 118 and scan state 120 in the system (e.g., in a file in memory 502 as shown in FIG. 5) for later access during an incremental scan. A security assessment 122 includes security findings that can include a list of all security issues (if any) detected in full scan 104, and the data-flow traces. In some aspects, the security findings can be indicative of no security issues (e.g., the list of security issues is empty).

After performing the full scan 104 (as depicted in block 202) processor 501 completes a second scan 103 to identify and compile a list of changed files. In some aspects, change detector 106 can execute any known identification technique such as, for example, a timestamp comparison or a checksum comparison.

As shown in block 204, processor 501 causes change detector 106 to detect files that have been modified, files that have been newly added to the application, and files that have been deleted from the application since the previous scan. Processor 501 then parses any changed files and generates a partial scan state or "incremental" IR.

As another step, processor 501 causes intermediate merger 110 to merge the previous scan state 120 with the incremental IR 124, as shown in block 206. In some aspects, intermediate merger 110 produces intermediate IR 125 for the entire application using information from full scan 104 (e.g., scan state 120) and incremental IR 124. The merge algorithm can also detect function-level changes during the merge process by comparing the program representations of functions (routines) in the incremental IR 124 with those in the previous scan state 120. Processor 501, via intermediate merger 110, detects function-level changes in source code 107. Changes in the application code 107 can include adding or deleting a source file (for example a java or a .class file). The changes can also include adding, modifying or deleting file-level, class-level or global variables. If the application source code is written in an object-oriented programming language then the changes in source code 107 can include extending an existing class. Function-level changes in the source code can include, for example, adding a new function to a source file, modifying an existing function or deleting a function. In an object-oriented programming language, the changes can include adding a virtual function. Function modifications can include changing the signature of the function, adding or renaming its local or formal variables, adding, modifying or deleting instructions in the function. In file-level granularity, if a source file contains, for example, 5 functions, then all 5 functions are considered to be modified even when one of them is modified. This increases the time for computing an impact graph of these changed functions and also since the impact graph is bigger, the analysis time is higher when compared to function-level change detection. In instruction-level granularity, if a function contains, for example, 10 instructions, and if only 2 of them are changed, then the impact graph is computed only for the changed instructions and not for the entire function. Experiments indicate that since the number of items to be tracked are considerably bigger than in the case of function-level tracking, and the impact graph creation is very precise, the time needed to compute the impact graph is significantly higher, though the time needed for analysis might be smaller. Also, the goal of instruction-level analysis is often to compute an incremental assessment and hence precise impact graph is needed.

At block 208, processor 501 can cause Incremental Analyzer 112 to use the function-level changes computed in block 206 to compute an impact graph. The impact graph includes all the changed functions and additional functions that may have been affected by those changed functions. As further depicted in block 208, processor 501 can cause Incremental Analyzer 112 to then perform an analysis on the impact graph, generating Incremental Assessment 113.

Referring again to FIG. 2, block 210 represents the assessment merger 114. Processor 501 can cause assessment merger 114 to perform the assessment merge algorithm, generating Security Findings 126 for the whole application.

According to one embodiment, processor 501 causes incremental analyzer 112 to define intermediate IR 125 to include a set consisting of global variables, functions defined and declared in the application and one or more referenced libraries associated with the application, one or more class fields, and one or more files that were scanned. For example, referenced function definitions library "function-def" is made to include the variables "formals," "locals," and "operations." In other aspects, a call can be a simple call or a virtual call. For example incremental analyzer 112 can be configured to set a simple-call to include variables for a caller, a callee, and a variable for arguments. In another aspect incremental analyzer 112 can be configured to set a virtual call to include the variables caller, callee, arguments, and virtual-overrides. As an exemplary result, function definitions libraries can include (but are not limited to):

```
IR = { function-decls, function-defs, globals, fields, files }
function-def = { formals, locals, operations }
function-decl = { formals }
Operations = { call, assignment, field-load, field-store }
simple-call = { caller, callee, arguments }
virtual-call = { caller, callee, arguments, virtual-overrides }.
```

The syntax described above is exemplary only. It should be appreciated that naming conventions and syntax are exemplary only and are not intended to be limiting.

According to embodiments of the invention, processor 501 first adds everything from the incremental IR 124 to the intermediate IR 125 from the initial full scan 104 to ensure that the latest (most recent) IR respective to the modified portions and new portions is being analyzed. Processor 501 can then load items from the previous IR in scan state 120 such that when the system loads the functions that belong to a file that has been modified, processor 501 compares it with the corresponding function entry in the IR that has been already loaded. FIG. 1 illustrates intermediate merger 110 in as having 2 outputs that include merged intermediate IR 125 and changed functions 127. Changed functions 127 can include a list of changed functions, if any are detected.

Accordingly, the comparison algorithm returns true if the two input functions are different at the IR level, and false if they are the same. For example, the following pseudo code explains:

```
//pre-condition = the signatures of the new and old functions are the same
bool isDifferent(new function, old function) {
    if both functions are just declared and not defined
        return false;
    if the number of operations are different
        return true
    if number of formal variables are not equal
        return true
    if number of local variables are not equal
        return true
    Iterate over the operations of new function and old function {
        if operation.type is not same
            return true
        else if number of argument for the operators is not same
            return true
        else
            do more detailed checks
    }
    return false;
}
```

According to embodiments of the invention, the merge algorithm demonstrated above is such that if the IR is different between 124 and 120, it will be quickly determined by processor 501. Since the functions being compared belong to modified files, the chances of their being different is higher, which reduces the overall comparison time. In some aspects, system 100 can provide a time-optimized change-detector at a function-level granularity, which can provide greater precision as compared to a file-level change detector.

Using this merge algorithm, processor 501 is configured to build lists of modified, newly added and deleted functions (e.g., call-graphs that contain, if any, changed functions 127). Accordingly, processor 501 can update all references (such as calls) to these functions and apply the intermediate IR 125 output to build a whole-application call-graph. The merge algorithm exemplified above system 100 can avoid building a precise impact-graph (which can be more time consuming as compared to embodiments described herein).

Instead of starting from the changes and transitively determining the impact of these changes and building a precise impact-graph (as some conventional system) one embodiment follows a much simpler approach which results in time-optimized detection performance. Accordingly, processor 501 can determine the set of disjointed call-graphs in the whole-application call-graph such that there is no call involving data going from one to the other. Each of these call-graphs has a distinct root node and it is identified by this root-node. Processor 501 identifies the call-graphs that contain the changed functions in 127, and runs the iterative taint-flow analysis only on these call-graphs and get security findings provided to assessment merger 114. In some aspects, processor 501 can cause assessment merger 114 to remove duplicates of the assessment merge.

For the trace findings, processor 501 merges the incremental security findings from the previous assessment 122 with incremental security findings from incremental analyzer 112. If the trace contains any function from changed_functions_set (changed functions 127), assessment merger 114 can determine the source of the trace, and add the source function to changed functions 127 Processor 501 runs an impact analysis on changed functions 127, finds incremental findings/traces, then adds all incremental findings to a final list of findings (security findings 126).

Embodiments of the invention present a system to isolate small changes to a developer's program file, convert it to a representation solely for the purpose of static security analysis, merge that change into a previous scan state, and do analysis upon the merged representation. This process can result in over 70% reduction in time required and allows for static security analysis on very small changes without incurring the large time investment.

Embodiments of the invention can be implemented on a single computer or in a distributed computing environment. It is understood in advance that although this description includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least four service models, and at least four deployment models.

Characteristics of a Cloud Model:

On-demand self-service: a cloud consumer can unilaterally provision computing capabilities, such as server time and network storage, as needed automatically without requiring human interaction with the service's provider.

Broad network access: capabilities are available over a network (e.g., network 506, as depicted in FIG. 5) and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network (e.g., network 506, as depicted in FIG. 5), servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks (e.g., network 506, as depicted in FIG. 5), servers, operating systems, or storage, but has control over the deployed applications and possibly application hosting environment configurations.

Infrastructure as a Service (IaaS): the capability provided to the consumer is to provision processing, storage, networks (e.g., network 506, as depicted in FIG. 5), and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems can include monitoring engines to track performance and usage, error monitoring, and data analysis engines.

Deployment Models:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party either locally or remotely.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 3:
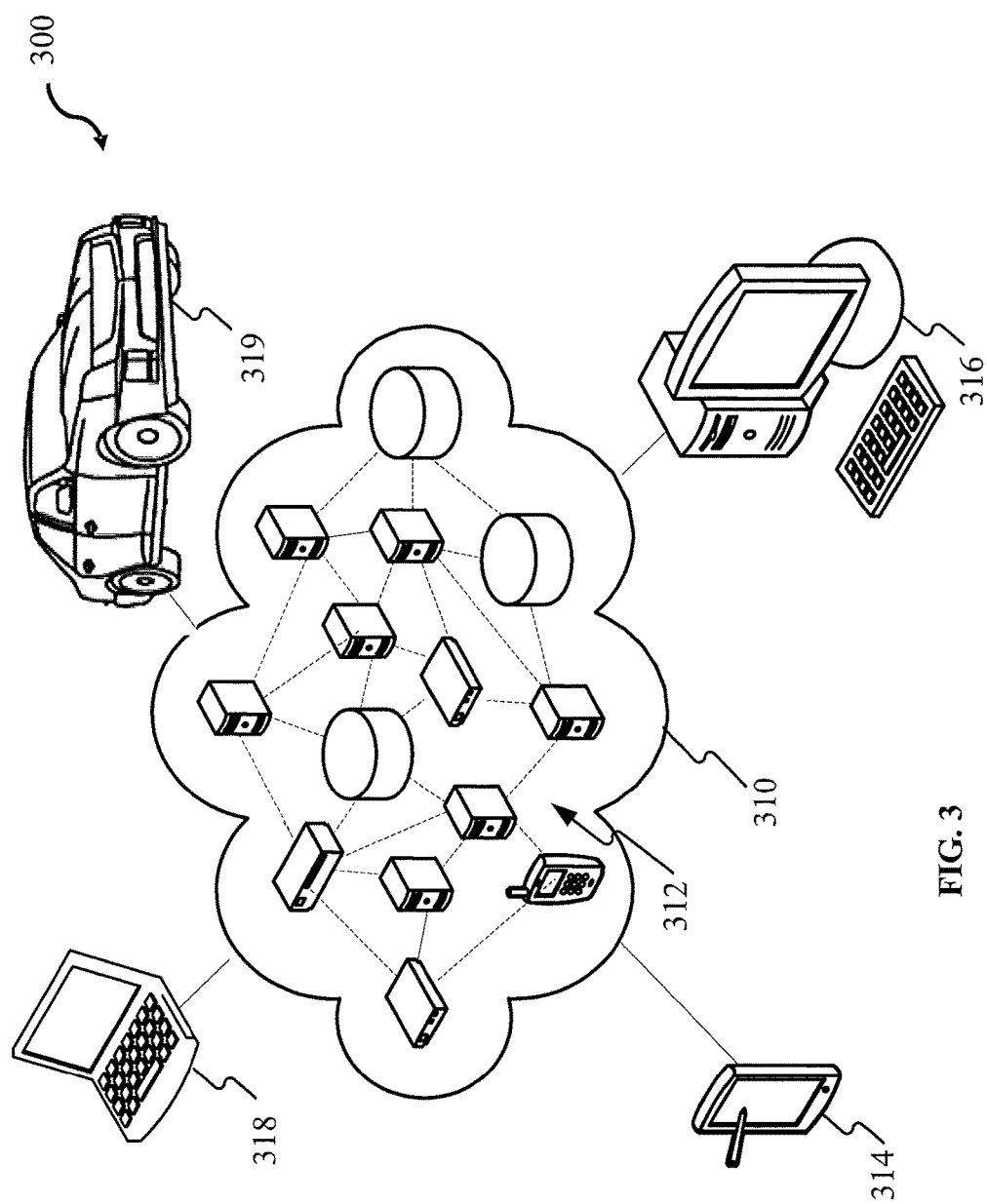
FIG. 3 depicts a cloud computing environment according to embodiments of the present invention.

Referring now to FIG. 3, a cloud computing environment 300 for use in practicing the teachings herein is depicted. As shown in FIG. 3, cloud computing environment 300 comprises one or more cloud computing nodes 312 with which local computing devices used by cloud consumers, such as, for example, a mobile device 314, a desktop computer 316, a laptop computer 318, and/or an automobile computer system 319 can communicate. Cloud computing nodes 312 can communicate with one another. They can be grouped (not shown) physically or virtually, in one or more networks 310, such as a Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 314-319 shown in FIG. 3 are intended to be illustrative only and that cloud computing nodes 312 and cloud computing environment 300 can communicate with any type of computerized device over any type of network and/or network addressable connection (e.g., using a web browser).

Figure 4:
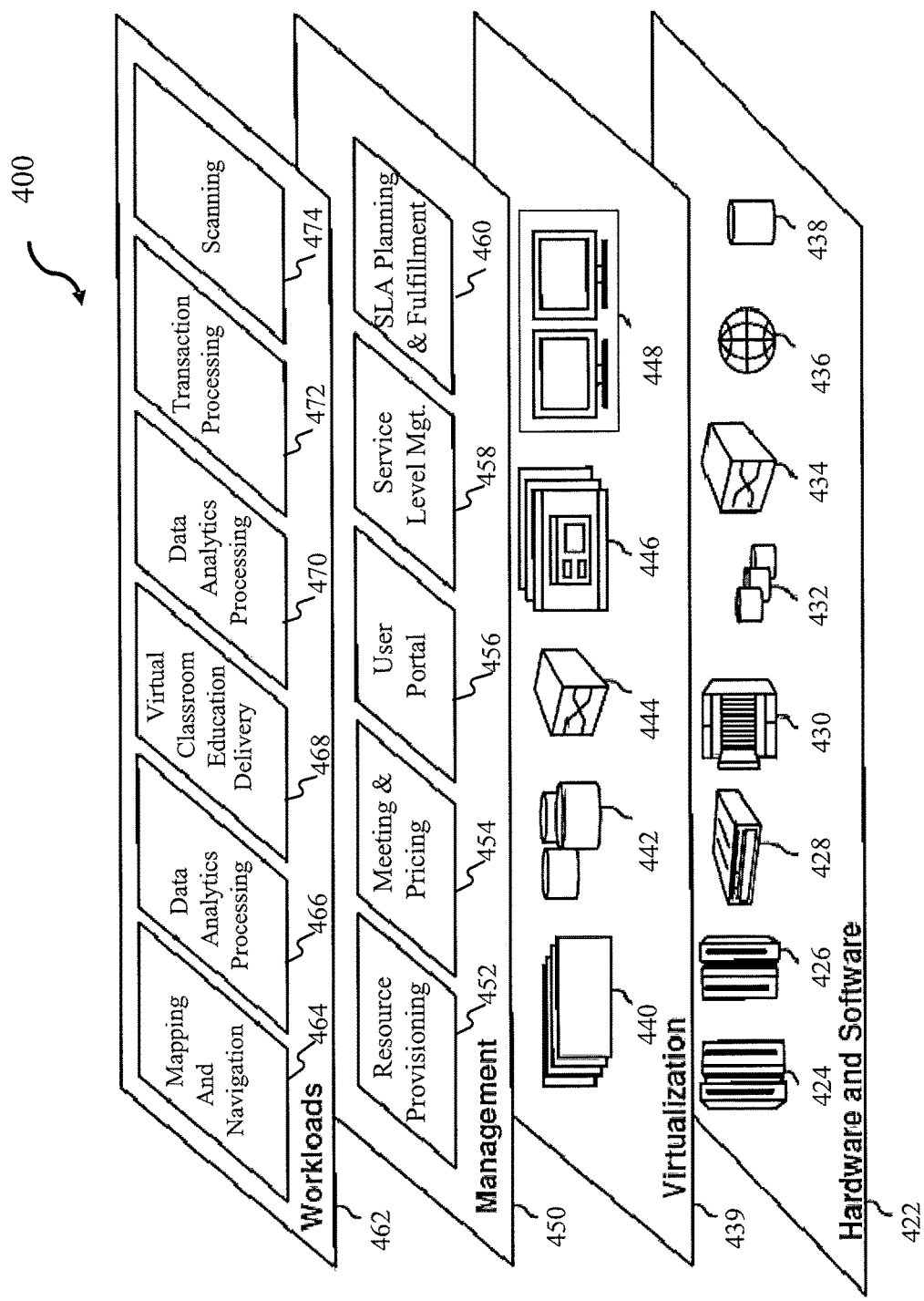
FIG. 4 depicts abstraction model layers according to embodiments of the present invention.

Referring now to FIG. 4, a set of functional abstraction layers 400 provided by cloud computing environment 300 is shown. It should be appreciated that the components, layers, and functions of functional abstraction layers 400 depicted in FIG. 4 are illustrative only, and embodiments of the invention are not limited thereto. As depicted, the following layers and corresponding functions are provided:

A hardware and software layer 422 can include hardware and software components. Examples of hardware components can include, for example, mainframes 424, 4RISC (Reduced Instruction Set Computer) architecture based servers 426, servers 428, blade servers 430, storage devices 432, and networks and networking components 434. In one embodiment, software components include network application server software 436 and database software 438.

A virtualization layer 439 can provide an abstraction layer from which the following examples of virtual entities can be provided: virtual servers 440, virtual storage 442, virtual networks 444, which can include virtual private networks, virtual applications and operating systems 446, and virtual clients 448.

In one example, a management layer 450 can provide the functions described below. A resource provisioning module 452 can provide dynamic procurement of computing resources and other resources that can be utilized to perform tasks within the cloud computing environment. A metering and pricing resource 454 can provide cost tracking as resources are utilized within the cloud computing environment, and billing or invoicing for consumption of these resources. In one example, metering and pricing resources can include application software licenses. A user portal 456 can provide access to cloud computing environment 300 for consumers and system administrators (not shown). In one embodiment, user portal 456 can provide security and/or identity verification for cloud consumers (e.g., one or more consumers operating one or more of computing devices 314-319) and tasks, as well as protection for data and other resources. A service level management resource 458 can provide cloud computing resource allocation and management such that required service levels are met. A service level agreement (SLA) planning and fulfillment resource 460 can provide pre-arrangement for, and procurement of cloud computing resources for which a future requirement is anticipated in accordance with an SLA.

A workloads layer 462 can provide functionality for which the cloud computing environment can be utilized. For example, workloads layer 462 can include a mapping and navigation resource 464, a software development and life-cycle management resource 466, a virtual classroom education delivery resource 468, a data analytics processing resource 470, a transaction processing resource 472, and scanning 474.

FIG. 5 illustrates a block diagram of an exemplary computing environment and computer system 500 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 500 therefore can embody a general-purpose computer. In another exemplary embodiment, the implementation can be part of a mobile device, such as, for example, a mobile phone, a personal data assistant (PDA), a tablet computer, etc.

As shown in FIG. 5, the computer 500 includes processor 501. Computer 500 also includes memory 502 communicatively coupled to processor 501, and one or more input/output adapters 503 that can be communicatively coupled via system bus 505. Memory 502 can be communicatively coupled to one or more internal or external memory devices via a storage interface 508. Communications adapter 516 can communicatively connect computer 500 to one or more networks 506. System bus 505 can communicatively connect one or more user interfaces via input/output (I/O) adapter 503. I/O adapter 503 can connect a plurality of input devices 504 to computer 500. Input devices can include, for example, a keyboard, a mouse, a microphone, a sensor, etc. System bus 505 can also communicatively connect one or more output devices 507 via I/O adapter 503. Output device 507 can include, for example, a display, a speaker, a touchscreen, etc.

Processor 501 is a hardware device for executing program instructions (aka software), stored in a computer-readable memory (e.g., memory 502). Processor 501 can be any custom made or commercially available processor, a central processing unit (CPU), a plurality of CPUs, for example, CPU 501a-501c, an auxiliary processor among several other processors associated with the computer 500, a semiconductor based microprocessor (in the form of a microchip or chip set), or generally any device for executing instructions. Processor 501 can include a cache memory 522, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 522 can be organized as a hierarchy of more cache levels (L1, L2, etc.).

Processor 501 can be disposed in communication with one or more memory devices (e.g., RAM 509, ROM 510, one or more external databases 521, etc.) via a storage interface 508. Storage interface 508 can also connect to one or more memory devices including, without limitation, one or more databases 521, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc.

Memory 502 can include random access memory (RAM) 509 and read only memory (ROM) 510. RAM 509 can be any one or combination of volatile memory elements (e.g., DRAM, SRAM, SDRAM, etc.). ROM 510 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 502 can incorporate electronic, magnetic, optical, and/or other types of non-transitory computer-readable storage media. Memory 502 can also be a distributed architecture, where various components are situated remote from one another, but can be accessed by processor 501.

The instructions in memory 502 can include one or more separate programs, each of which can include an ordered listing of computer-executable instructions for implementing logical functions. In the example of FIG. 5, the instructions in memory 502 can include an operating system 511. Operating system 511 can control the execution of other computer programs and provides scheduling, input-output control, file and data management, memory management, and communication control and related services.

The program instructions stored in memory 502 can further include application data 512, and for a user interface 513.

Memory 502 can also include program instructions for implementing a scanning engine 514, configured to performing full scans and running scan states, identifying changed files, detecting function level changes, performing incremental analyses, and merging the assessments.

I/O adapter 503 can be, for example but not limited to, one or more buses or other wired or wireless connections. I/O adapter 503 can have additional elements (which are omitted for simplicity) such as controllers, microprocessors, buffers (caches), drivers, repeaters, and receivers, which can work in concert to enable communications. Further, I/O adapter 503 can facilitate address, control, and/or data connections to enable appropriate communications among the aforementioned components.

I/O adapter 503 can further include a display adapter coupled to one or more displays. I/O adapter 503 can be configured to operatively connect one or more input/output (I/O) devices 507 to computer 500. For example, I/O 503 can connect a keyboard and mouse, a touchscreen, a speaker, a haptic output device, or other output device. Output devices 507 can include but are not limited to a printer, a scanner, and/or the like. Other output devices can also be included, although not shown. Finally, the I/O devices connectable to I/O adapter 503 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to one embodiment, computer 500 can include a mobile communications adapter 523. Mobile communications adapter 523 can include GPS, cellular, mobile, and/or other communications protocols for wireless communication.

In one embodiment, computer 500 can further include communications adapter 516 for coupling to a network 506.

Network 506 can be an IP-based network for communication between computer 500 and any external device. Network 506 transmits and receives data between computer 500 and devices and/or systems external to computer 500. In an exemplary embodiment, network 506 can be a managed IP network administered by a service provider. Network 506 can be a network internal to an aircraft, such as, for example, an avionics network, etc. Network 506 can be implemented in a wireless fashion, e.g., using wireless protocols and technologies, such as WiFi, WiMax, etc. Network 506 can also be a wired network, e.g., an Ethernet network, an ARINC 429 network, a controller area network (CAN), etc., having any wired connectivity including, e.g., an RS232 connection, R5422 connection, etc. Network 506 can also be a packet-switched network such as a local area network, wide area network, metropolitan area network, Internet network, or other similar type of network environment. The network 506 can be a fixed wireless network, a wireless local area network (LAN), a wireless wide area network (WAN) a personal area network (PAN), a virtual private network (VPN), intranet or other suitable network system.

Network 506 can operatively connect computer 500 to one or more devices including device 517, device 518, and device 520. Network 506 can also connect computer 500 to one or more servers such as, for example, server 519.

If computer 500 is a PC, workstation, laptop, tablet computer and/or the like, the instructions in the memory 502 can further include a basic input output system (BIOS) (omitted for simplicity). The BIOS is a set of routines that initialize and test hardware at startup, start operating system 511, and support the transfer of data among the operatively connected hardware devices. The BIOS is typically stored in ROM 510 so that the BIOS can be executed when computer 500 is activated. When computer 500 is in operation, processor 501 can be configured to execute instructions stored within the memory 502, to communicate data to and from the memory 502, and to generally control operations of the computer 500 pursuant to the instructions.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one embodiment, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of scanning application code, the method comprising:
    executing, via a processor, a full scan of the application code and generating a program intermediate representation (IR) and a list of security findings determined by the full scan;
    executing, via the processor, an incremental scan of the application code after at least one change to the application code;
    identifying, via the processor, at least one changed file in the application code;
    generating, via the processor, an incremental IR based at least in part on the at least one changed file by:
        defining, via the processor, a set of global variables and functions declared in the application code and one or more reference libraries associated with the application code; and
        setting, via the processor, a virtual call to include one or more variable caller, one or more callees, one or more arguments, and one or more virtual-overrides;
    merging, via the processor, a saved scan state and the incremental IR, and producing a merged scan state by:
        saving, via the processor, a scan state and adding the incremental IR to the saved scan state;
        loading one or more of the set of global variables to a system memory;
        comparing one or more function entries to the saved scan state to identify one or more changed functions;

generating, via the processor, a list of changed functions; and
identifying, via the processor, a call-graph containing the one or more changed functions; and
outputting, via the processor, security findings based at least in part on the merged scan state and the incremental IR.

2. The method of claim 1, wherein one or more changed functions in the application code is evaluated at a function-level.

3. The method of claim 1 further comprising: building, via the processor, a list of one or more call-graphs comprising modified, newly added, or deleted functions based at least in part on the at least one changed file.

4. The method of claim 1, wherein identifying comprises:
identifying call-graphs that contain the one or more changed functions; and
running an iterative taint-flow analysis only on the call-graphs containing the one or more changed functions.

5. The method of claim 1, wherein the security findings based at least in part on the merged scan state and the incremental IR comprise at least one file that poses a potential security risk based at least in part on a change made to the application code.

6. A system for scanning application code comprising:
a processor configured to:
execute a full scan of the application code and generate a program intermediate representation (IR) and a list of security findings determined by the full scan;
execute an incremental scan of the application code after at least one change to the application code;
identify at least one changed file in the application code;
generate an incremental IR based at least in part on the at least one changed file by:
defining, via the processor, a set of global variables and functions declared in the application code and one or more reference libraries associated with the application code; and
setting, via the processor, a virtual call to include one or more variable caller, one or more callees, one or more arguments, and one or more virtual-overrides;
merge a saved scan state and the incremental IR, and produce a merged scan state by:
saving, via the processor, a scan state and adding the incremental IR to the saved scan state;
loading one or more of the set of global variables to a system memory;
comparing one or more function entries to the saved scan state to identify one or more changed functions;
generating, via the processor, a list of changed functions; and
identifying, via the processor, a call-graph containing the one or more changed functions; and
output security findings based at least in part on the merged scan state and the incremental JR.

7. The system of claim 6, wherein the processor is configured to evaluate at least one changed file in the application code at a function-level.

8. The system of claim 6, wherein the processor is configured to build a list of one or more call-graphs comprising modified, newly added, or deleted functions based at least in part on the at least one changed file.

9. The system of claim 6, wherein the processor is configured to:
identify call-graphs that contain the one or more changed functions; and
run an iterative taint-flow analysis only on the call-graphs containing the one or more the changed functions.

10. The system of claim 6, wherein the security findings based at least in part on the merged scan state and the incremental IR comprise at least one file that poses a potential security risk based at least in part on a change made to the application code.

11. A computer program product for scanning application code, the computer program product comprising a non-transitory computer readable storage medium having program instructions embodied therewith, the program instructions executable by a processor to cause the processor to perform a method comprising:
executing a full scan of the application code and generating an intermediate representation (IR) and a list of security findings determined by the full scan;
executing an incremental scan of the application code after at least one change to the application code;
identifying at least one changed file in the application code;
generating an incremental IR based at least in part on the at least one changed file by:
defining a set of global variables and functions declared in the application code and one or more reference libraries associated with the application code; and
setting a virtual call to include one or more variable caller, one or more callees, one or more arguments, and one or more virtual-overrides;
merging a saved scan state and the incremental IR, and producing a merged scan state by:
saving a scan state and adding the incremental IR to the saved scan state;
loading one or more of the set of global variables to a system memory;
comparing one or more function entries to the saved scan state to identify one or more changed functions;
generating a list of changed functions; and
identifying a call-graph containing the one or more changed functions; and
outputting security findings based at least in part on the merged scan state and the incremental JR.

12. The computer program product of claim 11, wherein one or more changed functions in the application code is evaluated at a function-level.

13. The computer program product of claim 11, further comprising building, via the processor, a list of one or more call-graphs comprising any modified, newly added, or deleted functions based at least in part on the one or more changed functions.

14. The computer program product of claim 11, wherein identifying comprises:
identifying call-graphs that contain the one or more changed functions; and
running an iterative taint-flow analysis on the call-graphs containing the one or more changed functions.

* * * * *